United States Patent [19]

Hallett et al.

[11] Patent Number: 5,704,557
[45] Date of Patent: Jan. 6, 1998

[54] METHOD AND APPARATUS FOR TREATMENT OF ORGANIC WASTE MATERIAL

[75] Inventors: Douglas J. Hallett, Acton; Kelvin R. Campbell, Guelph, both of Canada

[73] Assignee: ELI Eco Logic Inc., Rockwood, Canada

[21] Appl. No.: 399,224

[22] Filed: Mar. 6, 1995

[51] Int. Cl.$^6$ ................................................ B02C 17/00
[52] U.S. Cl. ........................... 241/23; 241/27; 241/65; 241/176; 241/184
[58] Field of Search ........................... 241/23, 27, 65, 241/171, 174, 176, 184

[56] References Cited

U.S. PATENT DOCUMENTS

| | | | |
|---|---|---|---|
| 2,511,742 | 6/1950 | Shafer | 241/171 X |
| 2,607,667 | 8/1952 | Stalhed et al. | |
| 3,172,546 | 3/1965 | Schreiner | 241/65 X |
| 4,230,053 | 10/1980 | Deardorff et al. | 110/346 |
| 4,280,879 | 7/1981 | Taciuk | 202/100 |
| 4,301,137 | 11/1981 | Williams et al. | 423/481 |
| 4,316,878 | 2/1982 | Akune et al. | 423/235 |
| 4,402,274 | 9/1983 | Meenan et la. | 110/346 |
| 4,463,691 | 8/1984 | Meenan et al. | 110/346 |
| 4,474,121 | 10/1984 | Lewis | 110/346 |
| 4,481,891 | 11/1984 | Takeshita et al. | 110/238 |
| 4,533,087 | 8/1985 | Deve | 241/65 |
| 4,628,837 | 12/1986 | Mori et al. | 110/346 |
| 4,631,183 | 12/1986 | Lalancette et al. | 423/659 |

(List continued on next page.)

FOREIGN PATENT DOCUMENTS

| | | |
|---|---|---|
| 545241 | 6/1993 | European Pat. Off. |
| 1551838 | 6/1970 | Germany |
| 3836899 | 11/1989 | Germany |
| 21916 | 2/1984 | Japan |
| 232947 | 12/1984 | Japan |
| 2159137 | 11/1985 | United Kingdom |
| 8202001 | 6/1982 | WIPO |
| 9218214 | 10/1992 | WIPO |
| 9310862 | 6/1993 | WIPO |

OTHER PUBLICATIONS

Abstract of EP A 545 241 A: Goehler, P., Martin, H. and Schingnitz, M., "Recovery of thermal energy from wastes by e.g. pyrolysis . . .", Jun. 9, 1993, Derwent Info Ltd.
Abstract of EP A 545 241 B: Goehler, P., Martin, H. and Schingnitz, M., "Recovery of thermal energy from wastes by e.g. pyrolysis . . .", Jun. 9, 1993, Derwent Info Ltd.
Environment Canada, Economic and Technical Review, Report EPS, 3-EC-83-1, "Destruction Technologies for Polychlorinated Biphenyls", Feb. 1983, pp. 32-35, Ottawa, Canada.
Chemistry and Industry, vol. 102(19), Oct. 3, 1983, pp. 759-760, Letchworth Herts, R. Louw et al. "Thermal Hydrodechlorination of (Poly) Chlorinated Organic Compounds".
RGE Revue Generale de l'Electricité No. 8, Sep. 1987, pp. 156-162, Paris, France, J.P. Groo: "Déstruction des PCT: Procédés en Cours de Développement". English translation attached.
Resources and Conservation, vol. 14, 1987, pp. 365-368, Elsevier Science Publishers V.V., Amsterdam, R. Louw, J.A. Manion, P. Mulder. "Gas-Phase Thermal Hydrogenolysis of Organic Chlorine Compounds: An Alternative to Incineration".

Primary Examiner—John M. Husar
Attorney, Agent, or Firm—John C. Hunt

[57] ABSTRACT

A process and an apparatus for separation of relatively volatile from non-volatile material, typically an organic component of agglomerate waste material from an inorganic solid component of the waste. The process includes milling material in a container partially immersed or floating in a bath of molten material to break up the material, typically an agglomerate, and thermally releasing the relatively volatile component as vapor therefrom. The apparatus relates to a desorption vessel at least partially immersed in a molten tin bath for heat transfer from the bath to the interior of the vessel for desorption of the relatively volatile component from such material.

48 Claims, 6 Drawing Sheets

U.S. PATENT DOCUMENTS

| | | | |
|---|---|---|---|
| 4,655,968 | 4/1987 | Queiser et al. | 252/632 |
| 4,685,220 | 8/1987 | Meenan et al. | 34/10 |
| 4,699,721 | 10/1987 | Meenan et al. | 210/771 |
| 4,750,436 | 6/1988 | Maury et al. | |
| 4,778,606 | 10/1988 | Meenan et al. | 210/771 |
| 4,793,937 | 12/1988 | Meenan et al. | 210/771 |
| 4,819,571 | 4/1989 | Hallett | 110/346 |
| 4,848,249 | 7/1989 | LePori et al. | 112/234 |
| 4,951,417 | 8/1990 | Gerken et al. | 47/1.42 |
| 5,050,511 | 9/1991 | Hallett et al. | 110/346 |
| 5,264,654 | 11/1993 | Kreft et al. | |
| 5,292,429 | 3/1994 | DesOrmeaux | |
| 5,294,062 | 3/1994 | Hendrickson et al. | 241/67 |
| 5,340,037 | 8/1994 | Wallace et al. | 241/62 |
| 5,520,342 | 5/1996 | Hendrickson et al. | 241/67 |
| 5,529,251 | 6/1996 | Takami et al. | 241/65 |

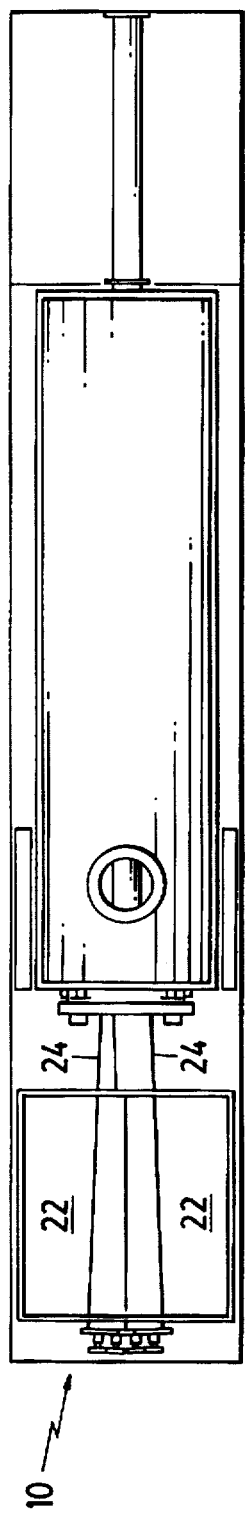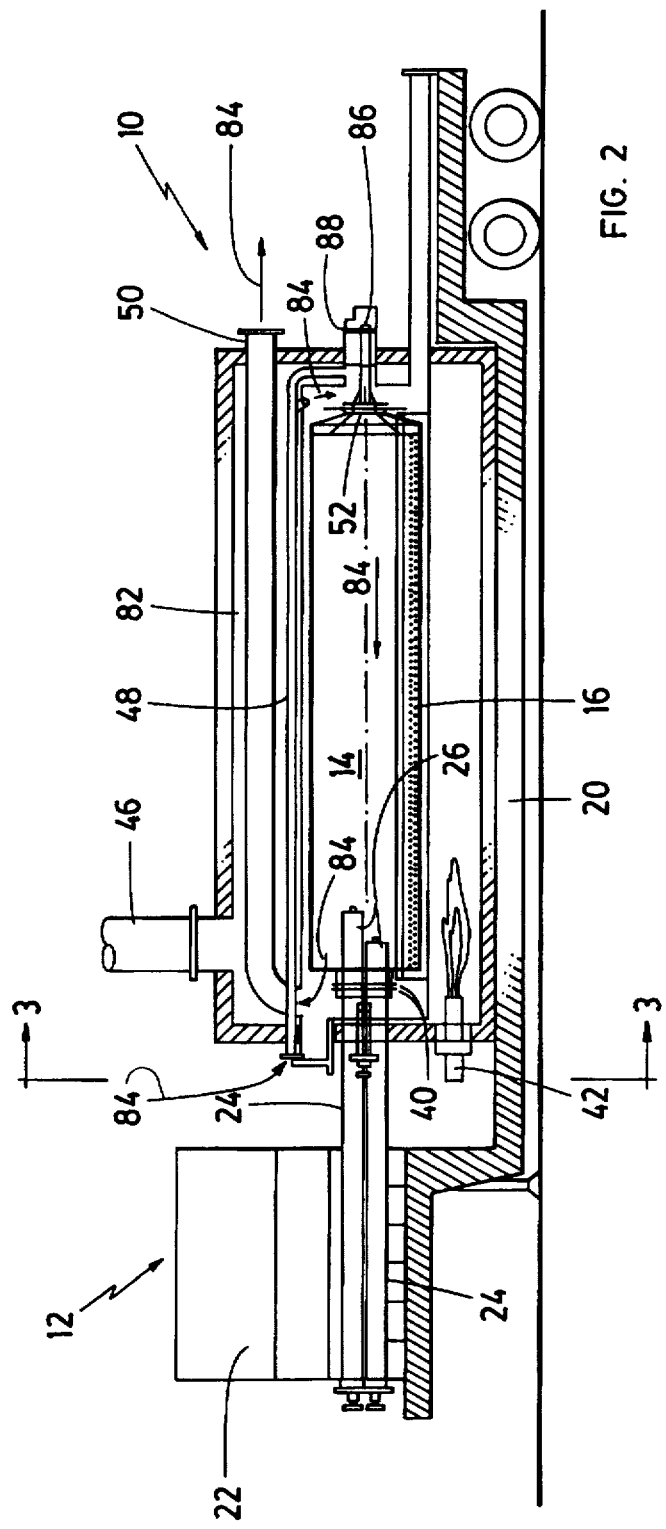

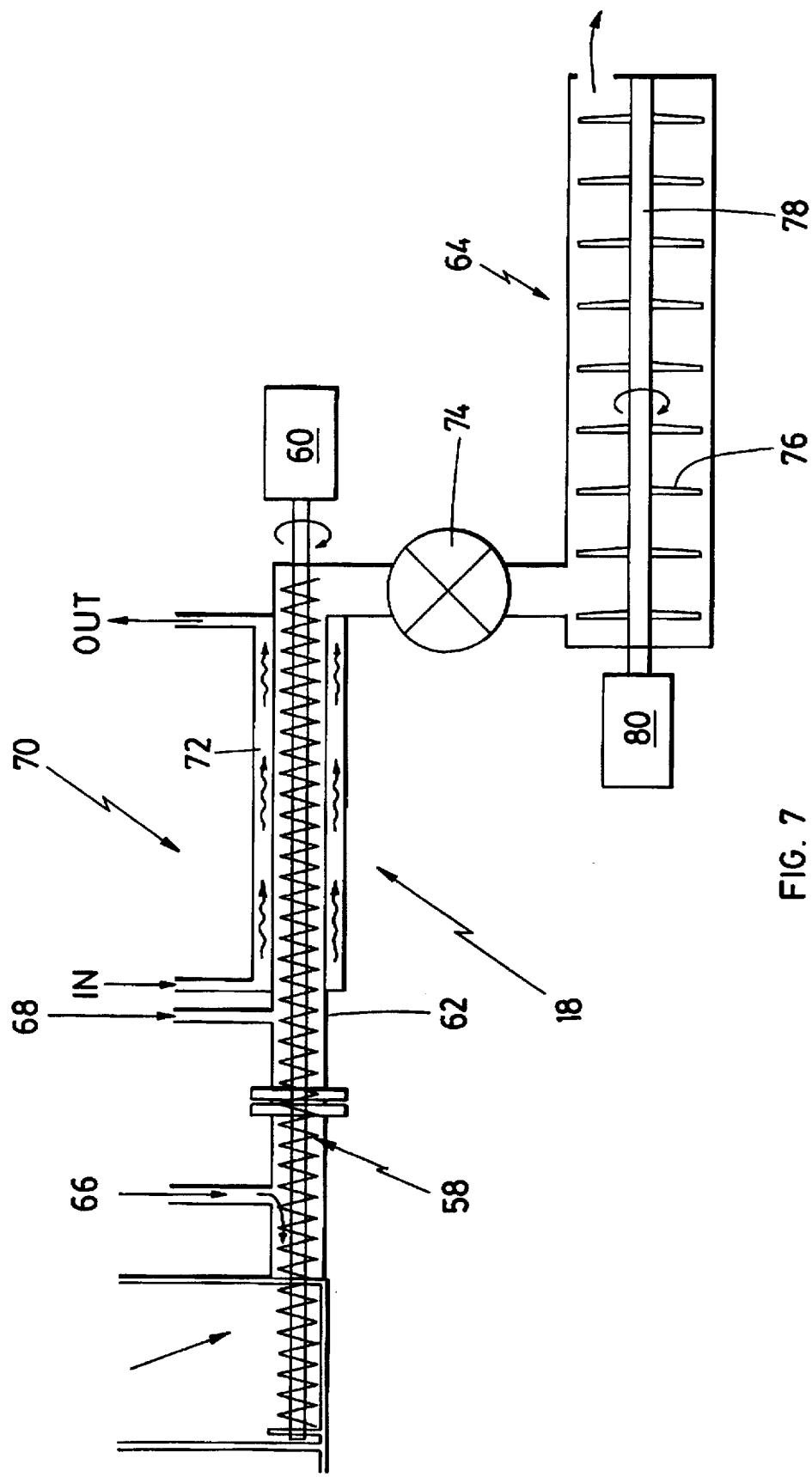

METHOD AND APPARATUS FOR TREATMENT OF ORGANIC WASTE MATERIAL

FIELD OF THE INVENTION

This invention relates to a process and an apparatus for separation of relatively volatile from non-volatile material, typically an organic component of waste material from an inorganic solid component of the waste. The process includes milling material in a container partially immersed or floating in a bath of molten material to break up the material, typically an agglomerate, and thermally releasing the relatively volatile component as vapor therefrom. The apparatus relates to a desorption vessel at least partially immersed in a molten tin bath for heat transfer from the bath to the interior of the vessel for desorption of the relatively volatile component from such material.

BACKGROUND TO THE INVENTION

It is known to destroy organic waste material by a variety of means. Particularly, reduction of organic materials such as polychlorinated biphenyls (PCBs) is described in U.S. Pat. Nos. 4,819,571 and 5,050,511, issued Apr. 11, 1989 and Sep. 24, 1991, respectively, the specifications of which are incorporated herein by reference.

In the treatment of wastes, it is often desirable to remove material which does not need to be destroyed prior to the actual destruction process. For example, pond dredgings can contain large amounts of inorganic materials such as metals and silicates which do not require destruction. Processing these materials can result in a lowering of the amount of material destroyed per unit time, an increase in the amount of energy required for the destruction as the inorganic materials consume thermal energy within the destruction reactor, increased downtime of the reactor for cleaning, and/or other reasons. In any case, it is often preferable to separate organic material to be destroyed from other materials, here termed variously "non-reactive" or "inert" materials, prior to introduction of the organics component to the destruction process. Such inert materials, which are generally solids, provided they are sufficiently free of materials considered to be hazardous compounds can be re-used as clean fill material, or disposed of as non-regulated materials. If hazardous inorganic compounds are present in the inert material, they may be recycled for metals recovery, subject to further processing, or disposed of in a suitable landfill.

U.S. Pat. No. 5,050,511 thus suggests, for example, a grits collection step, or a vitrification process, depending upon the nature of the non-reactive material to be separated, for pre-treating waste material having both organic and non-organic components.

To date, as far as the inventors of the process described here are aware, there continues to be a need for an improved treatment step in which inorganic solid materials are separated from organic materials and for separation of relatively volatile metals such as Hg, As, Cs from relatively non-volatile inorganic material.

The invention described below thus addresses such problems. The best process and apparatus for carrying out the invention currently known to the inventors are described below. It appears that the invention is particularly useful as a "pre-treatment" step in a larger process in which hazardous organic materials are subsequently treated or destroyed, and it is in this context that the best mode is described. It is to be understood, however, that the process and/or apparatus might well be useful in "stand alone" situations. It is thus contemplated, for example, that organic materials might be merely separated from inorganic solids and collected for subsequent industrial or other commercial purposes using the invention described below.

GENERAL DESCRIPTION OF THE INVENTION

In a first broad aspect, the present invention is a method for separating a relatively volatile component of an agglomerate having a solid component. The method includes milling the agglomerate in a container at least partially immersed in a bath of molten material to release the relatively volatile component as vapor therefrom. If desired or required, the released vapor can be captured.

In the context of this invention, an "agglomerate" is any material containing a component which when heated can be released in gaseous form. Such component is relatively volatile with respect to any remaining components which stay behind as solid material.

According to the preferred embodiment, described in greater detail below, the bath of molten material is heated during the treatment of the agglomerate so as to supply a source of energy for the vaporization process occuring in the milling container.

In a particular aspect of the invention, the molten material is molten tin.

In the preferred embodiment process, the milling container is a cylindrical drum having a central axis oriented generally horizontally and the milling step includes imparting a rotating movement to the drum about its axis to jostle or otherwise move about the material being treated according to the process within the container.

The method is suitable for the treatment of waste material, particularly where the waste material contains organic material. In such case, the capturing step includes entraining organic vapor released from the waste material in a gaseous stream, which stream is usually substantially free of oxygen. This is to avoid oxidation of the organic components in the mill, oxidation being generally undesirable, both in terms of material being treated and treatment apparatus components.

The gaseous stream may or may not be a reducing gas, such as hydrogen, methane, ethane, propane, butane, natural gas or a combination thereof.

The gaseous stream may be partially or entirely a relatively chemically non-reactive gas such as nitrogen or helium.

The stream might contain water in the form of steam.

In the preferred embodiment, the milling container has relatively chemically inert (at least under the conditions of the process being carried out) solid particles or bodies located inside. Movement of the container causes the bodies to move about and promote the breakdown of agglomerate particles into relatively small particles.

It has been found possible on the lab scale, and similar end results should be obtainable using the preferred embodiment described in detail below, to break up agglomerate materials to the varying degrees necessary to obtain effective release of organic components. It will be appreciated that in a scaled-up process, conditions required to obtain similar end results would probably vary somewhat.

Preferably, the solid bits or bodies are spheres, and most preferably, they are metal balls. The balls can have a diameter of between about one and six inches. A process in which all of the balls have a diameter of about 1½ inches has been found to work to promote the breakup of sludge particles, for example.

Remarkably, according to the preferred process, it has been found possible to obtain particles of relatively small and consistent size.

According to a second broad aspect, the invention includes a thermal desorption unit. The unit includes a desorption vessel sealed from the surrounding atmosphere for containing agglomerate material having a relatively volatile component to be thermally desorbed therefrom. The unit has a molten tin bath and the vessel is at least partially immersed in the molten tin bath for heat transfer from the bath to the interior of the vessel for desorption of the relatively volatile component from the agglomerate material.

It is to be understood that "thermal desorption" is to be taken in a broad sense in this context. Relatively volatile components may be released as gases by means of vaporization, and might be assisted by means of a chemical reaction, say one in which chemical bonds within a large organic molecule are broken through a chemical reaction with hydrogen of entrainment gases. The important thing is that heat transfer or thermal energy assist in the release of a relatively volatile component of the material being treated in the unit. There are means of release of relatively volatile components other than the two described here, as described in greater detail below in connection with the preferred embodiment.

In the preferred embodiment unit, there is an inlet port by which entraining gases are fed into the vessel and an exit port through which the entrainment and released gases flow out of the vessel, in a controlled manner.

The unit can of course include milling means such as solid bodies for intermingling with the material being treated contained within the vessel.

In the preferred embodiment, the vessel is a cylindrical container having a central axis oriented generally horizontally for rotation thereabout, and the milling means includes solid balls located in the container for intermingling with the agglomerate material during rotation of the container to break down pieces of the agglomerate material into smaller sizes.

The ratio of the horizontal length to the height of the vessel can be between about 3 to 1 and about 10 to 1, for example and a ratio of about 5 to 1 is thought to be suitable.

The preferred apparatus includes means for heating entrainment gases prior to entry into the vessel.

The preferred apparatus includes a hopper having a pair of compartments, each of the compartments being capable of connection to feeding means while being sealed from the surrounding environment and the other compartment, to permit, alternately, material to be fed from a first of the compartments into the vessel while sealed from a second of the compartments and the surrounding environment while material is being loaded into the second compartment and, material to be fed from the second compartment into the vessel while sealed from the first compartment and the surrounding environment while material is being loaded into the first compartment, to permit substantially continuous feeding of material to be treated into the desorption vessel.

In the preferred embodiment, the desorption vessel is a cylindrical container having a central axis oriented generally horizontally and having at least a lower portion of the container immersed in the molten tin bath.

These and other aspects of the invention are described further below in connection with the preferred embodiments of the invention.

BRIEF DESCRIPTION OF DRAWINGS

In the figures,

FIG. 1 is a top plan view of a mobile apparatus of the present invention;

FIG. 2 is a side elevation of the FIG. 1 apparatus in partial section;

FIG. 7 is a side elevation sectional view of the end-solids processing portion of the apparatus.

DETAILED DESCRIPTION OF PREFERRED EMBODIMENTS

Figure 3:
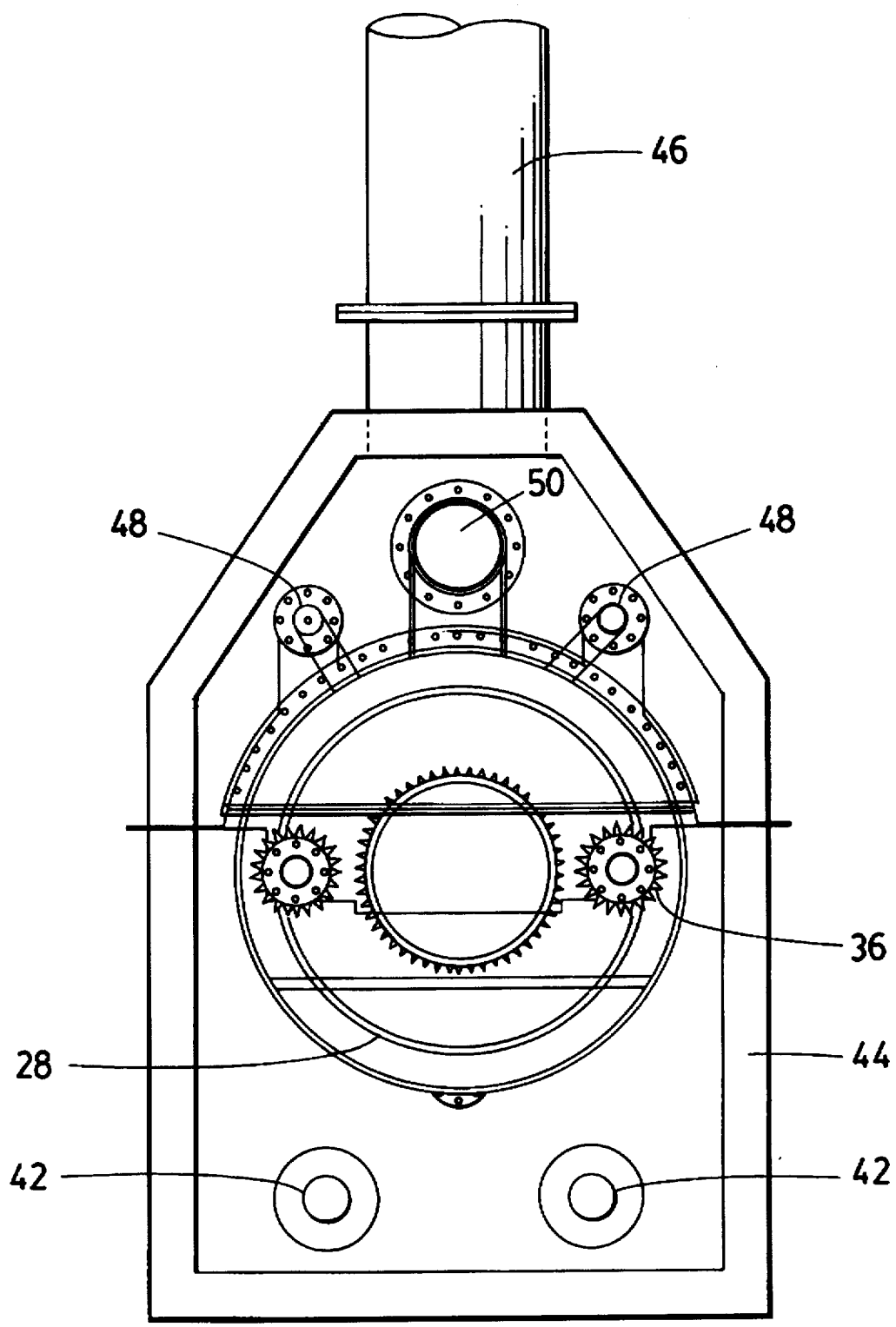
FIG. 3 is an end view of the agglomerate entry end of the apparatus taken along 3—3 of FIG. 2.
Figure 4:
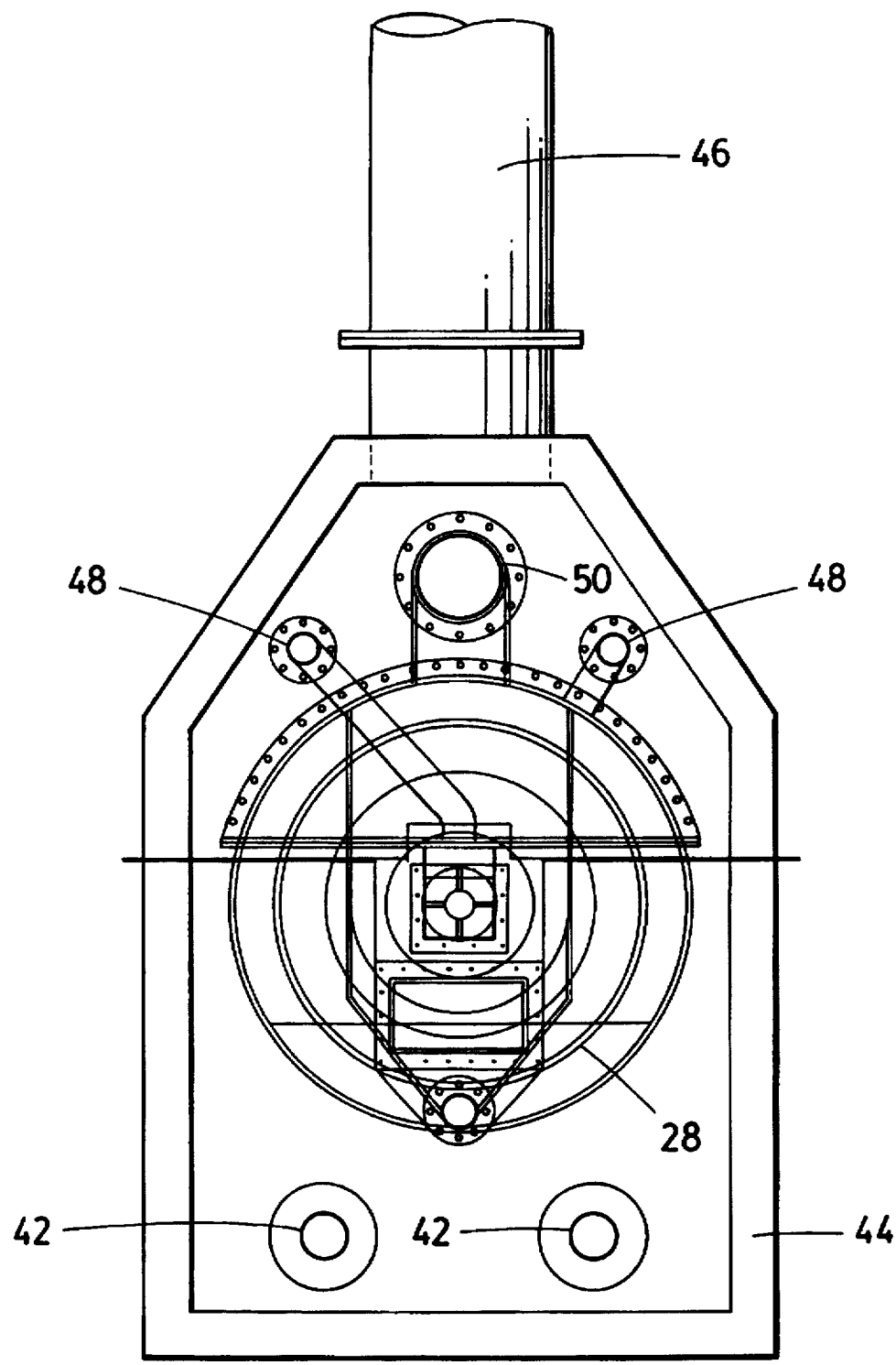
FIG. 4 is a detail of the apparatus seen from a similar vantage point of FIG. 3.
Figure 5:
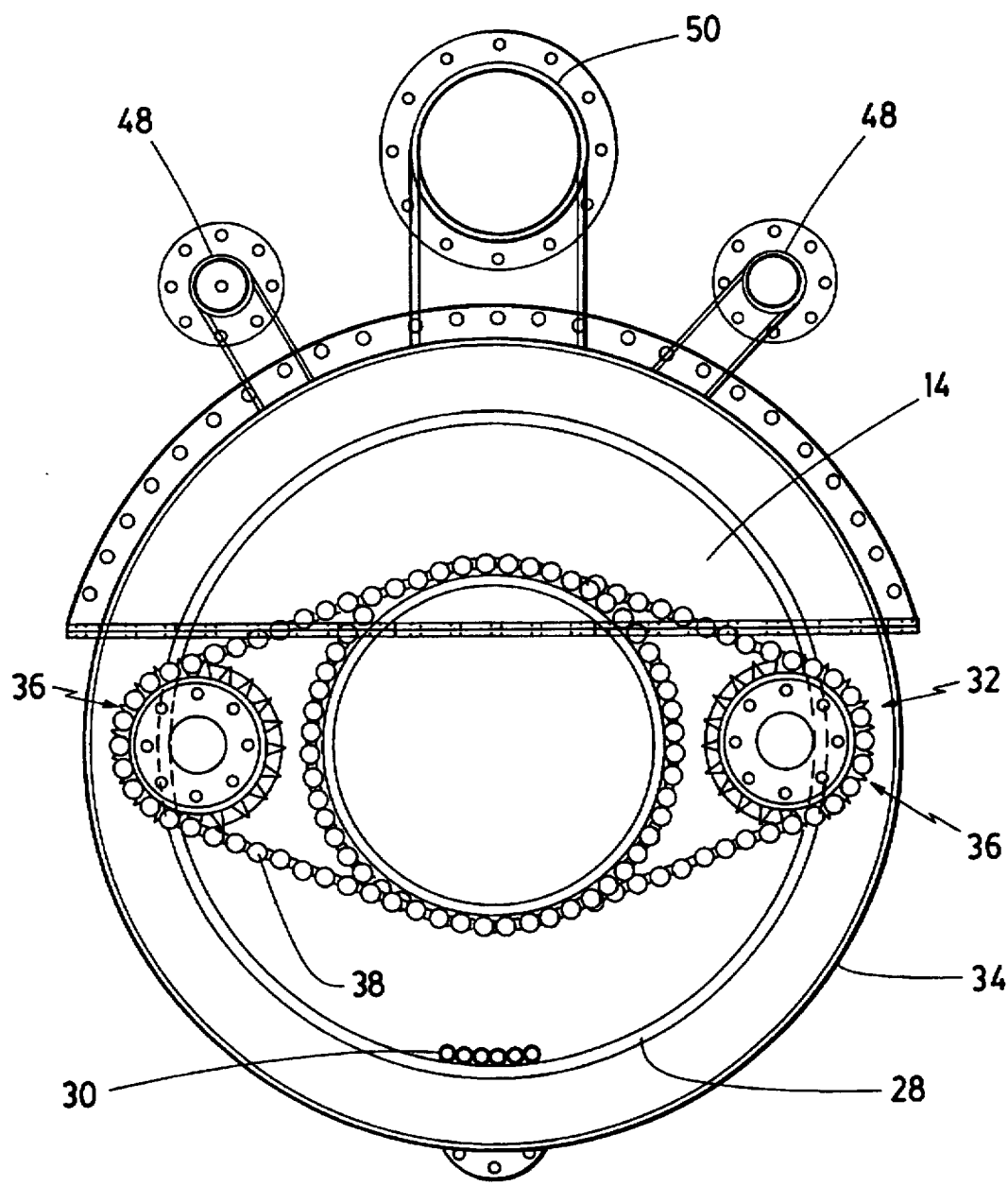
FIG. 5 is an end view of the solids exit end of the apparatus as seen from the right-hand side of FIG. 2.
Figure 6:
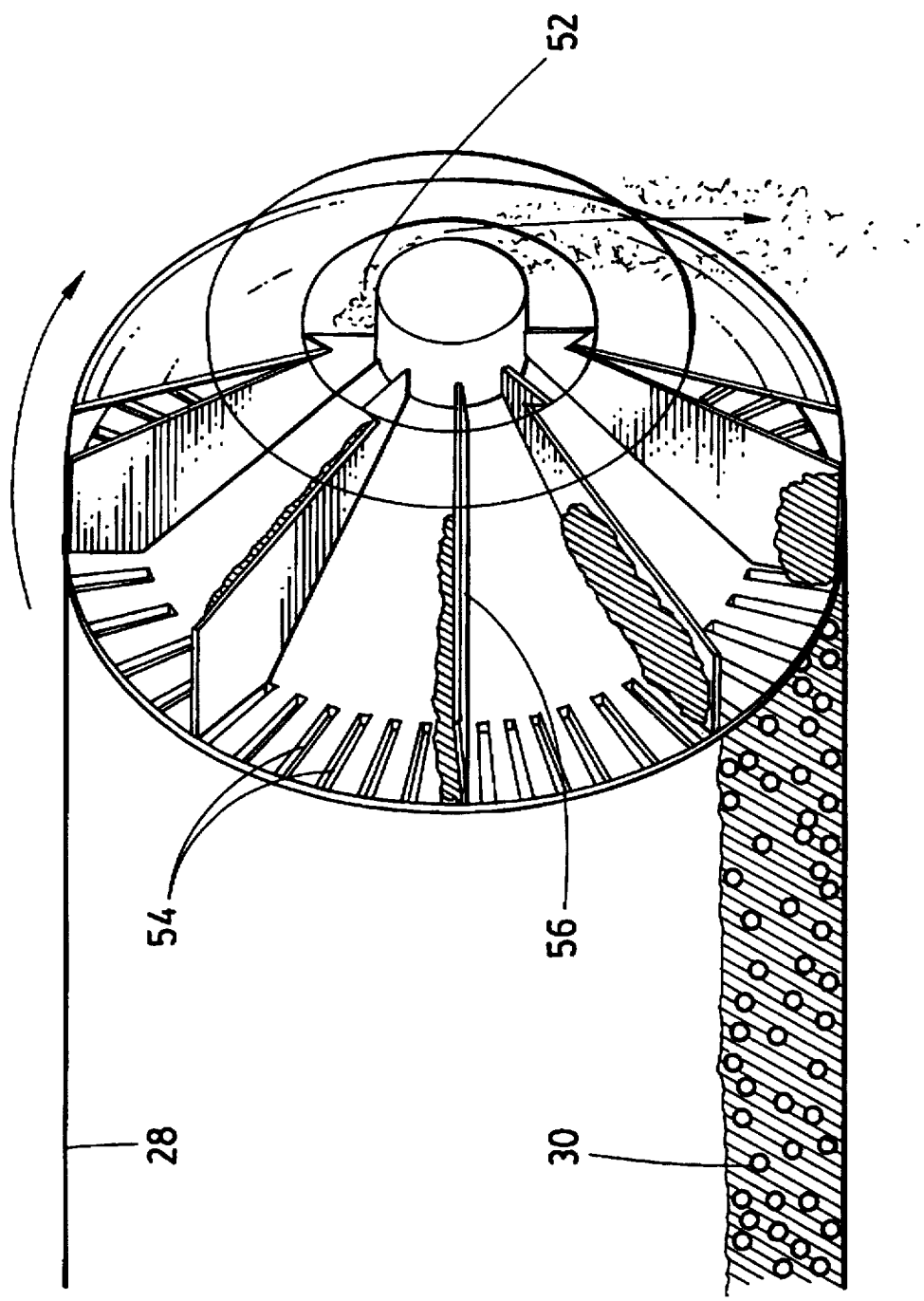
FIG. 6 is a perspective type detail of the exit end of the apparatus.

Turning to the drawings, a preferred embodiment mobile apparatus 10 is illustrated. Apparatus 10 generally includes waste input system 12, ball mill 14, tin bath 16 and solids recovery system 18 (see FIG. 7), mounted on 50-foot double-dropdeck trailer 20.

Waste input system 12, located at the forward end of the trailer, is divided into parallel feed lines, each line being essentially the same as the other, so only one will be described. Each line includes one hopper 22 having a wide top and narrow base. Tube 24, provides a communicating passage between the hopper and interior of mill 14. A conveyor including two pairs, of intermeshed, counter-rotating, 6 inch (about 15.2 cm) horizontal diameter screws 26 extending between the bottom of the hopper and the interior of the mill provides means for feeding stock material from the hopper into the ball mill. The arrangement is such that the lid of hopper 22 can be closed to isolate the hopper interior from external surroundings.

Ball mill 14 includes drum 28 containing 1½ inch (3.8 cm) steel balls 30. The drum is partially submerged in molten tin of bath 16 and is rotated by drive unit 32. The tin of the bath is contained in static drum 34. The drive unit includes two motors (not illustrated) having gears which intermesh with drive sprockets 36 connected through roller chains 38 to coaxial sprockets 40 located on a shaft centered on the axis of drum 28. Burners 42 are provided below tin bath 16 within oven 44. Release of combusted burner gases is provided through stack 46. A passage for incoming gases is provided by tube 48 which extends through a hot zone around the ball mill for entry of gases into drum 28 at the end opposite to that of feedstock entry. A passage for outgoing gaseous material is provided around tubes 24 to permit exit of gases into tube 50, gaseous material thus exiting from the drum at the same end at which feedstock enters. In the disclosed embodiment, tube 50 leads to a reduction vessel of the sort illustrated in U.S. Pat. No. 5,050,511, for example, for treatment of emerging gaseous material. A baffle is provided near solids exit port 52 by slots 54 to retain balls 30 within drum 28. Vanes 56, similar to those of the mixer of a cement truck, are located between the slots and exit port. Solids recovery system 18 includes conveyor 58 for removal of solids or grits emerging from port 52 in the exit end of drum 28. Conveyor 58, driven by motor 60, leads into tube 62 which leads ultimately to pug mill 64.

Solids recovery system 18 includes steam inlet port 66. Downstream from the steam inlet is water inlet port 68.

Material is further conveyed through cooling zone 70 cooled by water cooling jacket 72. Rotary airlock 74 is located between the cooling jacket and pug mill 64. The pug mill includes paddles 76 on shaft 78, which is driven by motor 80.

To begin operation, a batch of contaminated material is loaded into one of hoppers 22, the bottom of the hopper being sealed to isolate the system interior from the surroundings. The top of the loaded compartment is closed and thus sealed from the surrounding environment and the remainder of the apparatus. The compartment is then purged of oxygen by inflow of nitrogen through inlet and outlet valves, not illustrated. Other components of the apparatus sealed from the outside environment, that is tube 24, ball mill 14, gas entry tube 48, gas exit tube 50, tube 62 leading to the pug mill are similarly purged of oxygen. Likewise, the reduction vessel of the organic destructor, such as the one illustrated in U.S. Pat. No. 5,050,511, is also purged of oxygen.

The tin bath 16 is maintained in molten condition at a suitable temperature above the melting temperature of tin, that is above about 232° C. by heaters 42. Drum 28 is set to rotating and augers 26 are rotated to convey waste material from the loaded hopper through tube 24 into the rotating drum. In the drum, the waste material is brought into contact with hot balls 30 and generally tossed about, smashed apart, pulverized, or otherwise generally broken down into relatively small particles. Further, heat transfer from the hot balls and the hot drum wall causes organic material to be volatilized or otherwise dispersed into the atmosphere of the drum.

Hydrogen is fed through tube 48, which itself passes through heating zone 82 for entry into the drum at the end opposite to that of entry of the crude waste, hydrogen flow being controlled by an appropriate valve. The hydrogen is thus heated prior to entry into drum 28. Volatilized material released from the waste is entrained by the hydrogen flowing generally in the direction of arrows 84 and thusly directed into gas exit tube 50 for travel to the reactor for destruction.

The arrangement is such that, initially, at the waste input entry end of the drum, water and very volatile compounds are heated and vaporized. Less volatile and semi-volatile organic compounds are later volatilized as the temperature of the solids in the drum increases, in combination with the increased accessibility of the hydrogen to the solids once the water has boiled off. With further heating, high molecular weight hydrocarbons and other relatively non-volatile organic compounds such as cellulose and polymerized hydrocarbons are gasified into smaller gaseous molecules, possibly leaving behind some residual carbon.

Ultimately, solid remnants of the waste material, or grits that are chemically inert to the conditions inside the drum, are formed. The grits travel generally toward the exit end of the drum. Eventually such grits pass through slots 54 to be conveyed toward port 52 by rotating vanes 56 to drop finally to auger 58 which conveys the grits to the pug mill. Slots 54 are sufficiently small to retain any large chunks of stock material that have not been suitably broken down within the drum.

Conveyor 58, made up of screw and paddle conveyors, is about four feet in length and conveys the material to the pug mill. Steam is injected through port 66. Such steam, to some extent, provides a gas seal and lessens recontamination of solids due to counterflow of clean steam versus contaminated vapor. A controlled flow of water is injected a few inches upstream of the pug mill through inlet port 68. Most of the water is swept downstream and mixes with and aids cooling of the exiting solids to form a pasty material. The damp material is conveyed through cooling zone 70 cooled by water cooling jacket 72. Material is conveyed to rotary air lock 74 and into pug mill 64. The pasty material is compressed and accumulated within the pug mill and eventually extruded therefrom as a relatively homogeneous paste. The pug mill also aids sealing the solids exit end of the apparatus from the external environment.

As the waste loaded into one of the hopper compartments 22 is being treated, the other of the compartments can be isolated from the remainder of the system and loaded with waste and the compartment purged. Once the first batch has been fed into the drum, the first compartment can be closed off from the system and the second one opened to provide for more or less continuous feeding of waste material into the drum even though the material is fed alternatingly into the two hoppers 22 in batches.

Eventually, the gaseous product stream of the reduction process, which generally contains hydrogen, can act as a source for the entrainment stream.

It will be appreciated that is important to isolate the interior hydrogen flow passages from the external environment, hydrogen being highly reactive with oxygen.

The separation process itself (i.e., of the relatively volatile and non-volatile materials) disclosed herein is generally referred to in the art as thermal desorption. This is because heat transfer or thermal energy transfer to the waste material causes relatively volatile organic components of the material to be desorbed from the relatively non-volatile components, such as sand for example.

Hydrogen, or mixtures containing substantial concentrations of hydrogen, are the preferred entrainment gases in the process described here because hydrogen is the gas used to reduce desorbed organics in a subsequent step as described in U.S. Pat. No. 5,050,511. Although its primary purpose here is to entrain thermally desorbed materials and direct them into the chemical reduction reactor to be destroyed, it will be appreciated that some reduction might even occur in the desorption apparatus itself. Further, hydrogen, because of its small size and ability to penetrate porous surfaces, assists in the desorption process. The reactivity of hydrogen permits the occurrence of reactions that can possibly enhance the desorption of organic molecules from inorganic materials. Hydrogen may also weaken the effect of hydrogen bonding between molecules or to surfaces such as clays, to permit improved desorption efficiency. Hydrogen is thus expected to provide enhanced desorption characteristics over nitrogen, helium or other inert gases.

It might, nonetheless, be desirable, in other applications in which it is desired to simply collect the desorbed material, to use steam, nitrogen, or helium, for example, or mixtures thereof as entrainment gases. Of course, oxygen would not be used in most situations if oxidation of desorbed material is to be avoided.

The drum of the disclosed embodiment is about 4 feet (about 1.2 meters) in diameter by about 20 feet (about 6.1 meters) in length and is of stainless steel. The interior curved wall of the mill would generally be contoured so as to reduce any surging type movement of the balls. Enough balls to obtain 3 to 7 rows would be suitable in many situations.

The interior of the drum could well be lined with a suitable material so as to extend the life of the stainless steel.

For soil or sludge containing PCBs, a bath temperature of between about 500° C. and 600° C. would likely be suitable for desorption. Precise operating conditions such as the bath temperature, number of balls, speed of rotation of the drum, rate of input of waste material into the drum, rate of entrainment gas flow, and residence time of solids in the drum, etc. can be determined from situation to situation.

Physical reduction in particle size and the fracturing of organic fibers resulting from the pulverizing action of the moving balls on waste material will lead to improved desorption of organic components from wastes containing solids, or otherwise agglomerated materials such as silty clays, etc. Small particle size increases the surface area available for the solid-gas interface which permits an increased rate and extent of desorption of organic chemicals from the non-volatile material.

The disclosed process and apparatus might well be particularly well suited to pretreating tars containing polyaromatic hydrocarbons (PAHs) for desorbing PAHs for subsequent destruction or other treatment.

Other possible applications would include pretreatment of other hazardous organic wastes, hazardous metals, coal tars, biomedical wastes, and pulp and paper wastes.

It will be appreciated that the mechanism of separation of components, although described here primarily as being a physical and chemical desorption process, could involve vaporization, gasification and, given a reducing atmosphere, partial chemical reduction, alone or combination.

In any case, it has been found possible, to obtain lab-scale results showing the effectiveness of this invention. Hydrogen was used as the entrainment gas. In a scaled-up process, the primary operative variables affecting the degree of volatilization will likely be overall drum residence time of the material in the mill and the temperature in the mill. Lab-scale results are presented in Table I.

TABLE I

SUMMARY OF LAB-SCALE TEST RESULTS OF THERMAL DESORPTION MILL

| Waste Type | Waste PCB Concentration (ppm) | Grit PCB Concentration (ppm) |
| --- | --- | --- |
| Soil (tarry, oily) | 39 | 0.01 |
| Soil (dry, sandy, PCB-spiked) | 440 | 0.0039 |
| Soil (dry, sandy, PCB-spiked) | 520 | 0.0016 |
| Sediment (muddy, fine, PCB-spiked) | 710 | 0.028 |
| Sediment (muddy, fine, PCB-spiked) | 790 | 0.0097 |
| Sediment (muddy, fine, PCB-spiked) | 750 | 0.065 |
| Sediment (muddy, fine) | 7.3 | 0.0029 |
| Sediment (muddy, fine) | 8.3 | 0.0066 |
| Sediment (muddy, fine) | 8.3 | 0.0013 |
| Sediment (muddy, fine) | 420 | 0.0017 |
| Sediment (muddy, fine) | 420 | 0.012 |
| Sediment (muddy, fine) | 2000 | 0.044 |
| Sediment (muddy, fine) | 1200 | ND (0.011) |
| Sediment (muddy, fine) | 8.3 | ND (0.005) |

As can be seen in Table I, the PCB concentration of starting waste material is substantially reduced, to a fraction of a part per million in the grit remains after treatment according to the process of the invention. The illustrative results were obtained using molten tin temperatures of between 500° C. and 600° C. and processing time of 5 to 15 minutes. While results obtained depend upon the residence time in the mill of the material being processed, the temperature inside the mill, etc. it is clear that large amounts of PCB material can be effectively desorbed from differing types of starting material using the invention disclosed herein.

For the treatment of waste material, the primary object of a person using the invention is likely to be removal of volatilizable material at least to the extent necessary to meet regulatory requirements of a given locale. It should be possible to obtain reproducible and thus predictable results using the described process and apparatus for a given sort of starting waste material. It is thus understood that the term "milling" includes breakdown of agglomerate material into its component parts so as to permit release of volatilizable material, but of course, solid particulates could also be broken or worn down into smaller sized particles using the disclosed process.

In the disclosed embodiment, the arrangement is such that the drum is submerged in the molten tin to about 15% of its diameter. This too could be varied. The high density of tin makes it a suitable bath material on which to support a rotating drum. As well, the high thermal conductivity, low viscosity, high surface tension and non-reactivity with hydrogen of tin, make it a particularly suitable bath material.

The height at which drum 28 sits with respect to bath drum 34 can vary according to the amount of tin in drum 34 or with the weight of the material in drum 28 at a given time. Limited variation in the height is accommodated by the roller drive chain arrangement at the feed stock end and by mounting of drum centering shaft 86 to a bearing mounted on a vertical guide 88 at the solids exit end of the apparatus.

As previously mentioned, tin has a melting point of about 232° C. The boiling point is about 2260° C. and elemental tin is of relatively low toxicity. There is thus a fairly wide temperature range over which the disclosed process can be operated, keeping in mind the reduced stress capacity of materials such as stainless steel, etc., with increasing temperature.

There are two burners 42 in the disclosed embodiment which use propane, natural gas, or any suitable fuel. Reduction products of the waste destruction process might even be used as fuel for the burners. Multiple burner manifold systems operating at high air:fuel ratios could also be used to provide more uniform heating and to control flame temperature. There are walls external of the drum which form an oven divided into upper and lower chambers. Combusted burner gases are first directed through the lower oven chamber toward the grit exit end of the drum. The gases are then directed through the upper oven chamber to heat the upper portion of the drum, inwardly flowing sweep gases, tube 48, and exiting sweep and desorbed gases, tube 50. Combusted burner gases are ultimately vented from the oven to the outside atmosphere through stack 46.

An alternative arrangement to the waste input system 12 illustrated above is a system including a progressive cavity pump, there again being parallel feed lines essentially identical to each other for more or less continuous feeding of alternately loaded batches of material. An example of such pumps include those available from Bornemann, or from Ingersoll-Dresser Pump Company of Chesapeake, Va.

As the process and apparatus described herein can often be used with materials that are hazardous if released to the environment, any use of the invention should include proper monitoring and safety measures. For example, one or more monitors capable of detecting hazardous material would typically be placed at the pug mill exit with appropriate automatic controlled shut down of the apparatus possible if leakage of hazardous material through the exit was found.

It will of course be understood that the foregoing description is of the preferred mode currently known to the inventors but that given an understanding of the invention, a person skilled in the art would realize that variations from the foregoing are possible, the scope of the invention being defined by the appended claims.

What is claimed is:

1. A method for separating a relatively volatile component of an agglomerate having a solid component, the method comprising milling the agglomerate in a container having relatively chemically inert solid particles located therein by movement of the container to mix the particles and agglomerate so as to break down the agglomerate to relatively small particles, wherein the container is at least partially immersed in a bath of molten material which is heated for transfer of energy from the bath to the interior of the container to promote release of the relatively volatile component as vapor from the solid particles.

2. The method of claim 1, further comprising the step of capturing the vapor to preclude release thereof into the environment.

3. The method of claim 1 wherein the molten material is molten tin.

4. The method of 3 wherein the agglomerate is waste material and the relatively volatile component comprises organic material and the capturing step includes entraining organic vapor released from the waste material in a gaseous stream substantially free of oxygen.

5. The method of claim 4 wherein the gaseous stream includes a reducing gas.

6. The method of claim 5 wherein the reducing gas is selected from hydrogen, methane, ethane, propane, butane, natural gas or a combination thereof.

7. The method of claim 5 wherein the gaseous stream includes nitrogen, steam, helium or a combination thereof.

8. The method of claim 5 wherein the gaseous stream has an initial concentration of hydrogen of at least about 50 per cent.

9. The method of claim 3 wherein there are relatively chemically inert solid particles located in the bottom of the container and the milling step includes moving the particles within the container to mix the particles and agglomerate so as to break down the agglomerate.

10. The method of claim 3 wherein the container is a cylindrical drum having a central axis oriented generally horizontally and the milling step includes rotating the drum about the axis.

11. The method of claim 10 wherein the drum has a length:diameter ratio of between about 3:1 and about 10:1.

12. The method of claim 11 wherein the ratio is about 5:1.

13. The method of claim 10 wherein the drum rotates between about 5 and about 30 revolutions per minute.

14. The method of claim 13 wherein the drum rotates at a rate of about 15 revolutions per minute.

15. The method of claim 10 wherein the drum is of stainless steel.

16. The method of claim 10 wherein the drum contains relatively chemically inert solid bodies and the milling step includes rotating the drum such that the bodies and agglomerate intermingle so as to break relatively large pieces of the agglomerate down into relatively small pieces so as to enhance release of the relatively volatile component.

17. The method of claim 16 wherein the solid bodies are spheres.

18. The method of claim 16 wherein the solid bodies are metal balls.

19. The method of claim 18 wherein the balls have a diameter between about one and six inches.

20. The method of claim 19 wherein the diameter of the balls is about 1½ inches.

21. The method of claim 1 further comprising the step of entraining organic vapor released from the waste material with hydrogen.

22. The method of claim 1 wherein the milling step includes breaking up the agglomerate to obtain relatively small and consistently sized particles.

23. The method of claim 1 including maintaining the temperature in the container between about 300° C. and about 600° C.

24. The method of claim 23 wherein the temperature is between about 500° C. and about 600° C.

25. The method of claim 1 wherein the solid component has a residence time in the container of between about 5 and about 20 minutes.

26. The method of claim 25 wherein the residence time of the solid component in the container is between about 10 minutes and about 15 minutes.

27. The method of claim 1, further comprising the step of entraining the released vapor in a gaseous stream to transfer the vapor to a treatment zone.

28. The method of claim 27 wherein the vapor is chemically reduced in the treatment zone.

29. The method of claim 27 wherein the vapor is condensed to a liquid in the treatment zone.

30. A thermal desorption unit, comprising:
 a desorption vessel sealed from the surrounding atmosphere, for agglomerate material having a relatively volatile component to be thermally desorbed therefrom;
 a molten tin bath, the vessel being at least partially immersed in the molten tin bath for heat transfer from the bath to the interior of the vessel for desorption of the relatively volatile component from the agglomerate material; and
 means for milling the agglomerate within the vessel to enhance the thermal desorption of the relatively volatile component.

31. The thermal desorption unit of claim 30, further comprising a heater for the bath, to act as a heat source for said heat transfer.

32. The thermal desorption unit of claim 31, further comprising means for capturing desorbed gaseous material released from the agglomerate material.

33. The thermal desorption unit of claim 32, wherein the capturing means includes a storage vessel connected to the desorption vessel by a valve, for transfer of gaseous material from the desorption vessel to the storage vessel.

34. The thermal desorption unit of claim 32, further comprising means for entraining desorbed gaseous material released from the agglomerate material.

35. The thermal desorption unit of claim 34, wherein the entraining means includes an inlet into the vessel for controlled entry thereinto of entrainment gases and an outlet from the vessel for controlled exit of gaseous matter.

36. The thermal desorption unit of claim 31, wherein said desorption vessel is a cylindrical container having a central axis oriented horizontally and at least a lower portion of the container is immersed in the molten tin bath.

37. The thermal desorption unit of claim 30, wherein said desorption vessel is a cylindrical container having a central axis oriented generally horizontally for rotation thereabout, and the milling means includes relatively chemically inert solid bodies located in the container for intermingling with the agglomerate material during rotation of the container to break down pieces of the agglomerate material into smaller sizes.

38. The thermal desorption unit of claim 37 wherein the ratio of the horizontal length to the height of the vessel is between about 3 to 1 and about 10 to 1.

39. The thermal desorption unit of claim 38 wherein the ratio is about 5 to 1.

40. The thermal desorption unit of claim 37, wherein the desorption vessel has an entry port for the agglomerate material at a first axial end of the container and an exit port for relatively non-volatile non-desorbed materials at a second axial end of the container.

41. The thermal desorption unit if claim 40, further comprising means for entraining desorbed gaseous material released from the agglomerate material.

42. The thermal desorption unit of claim 41, wherein the entraining means includes an inlet into the vessel for entry thereinto of entrainment gases at the second axial end of the container and an outlet from the vessel for exit of gaseous matter from the first axial end of the container.

43. The thermal desorption unit of claim 42, further comprising means for heating entrainment gases prior to entry into the vessel.

44. The thermal desorption unit of claim 43, further comprising means for feeding the agglomerate material into the vessel through the entry port.

45. The thermal desorption unit of claim 44, further comprising a hopper having a pair of compartments, each of the compartments being capable of connection to the feeding means while being sealed from the surrounding environment and the other compartment, to permit, alternately, agglomerate material to be fed from a first of the compartments into the desorption vessel while sealed from a second of the compartments and the surrounding environment while agglomerate material is being loaded into the second compartment and, agglomerate material to fed from the second compartment into the desorption vessel while sealed from the first compartment and the surrounding environment while agglomerate material is being loaded into the first compartment, to permit substantially continuous feeding of agglomerate material into the desorption vessel.

46. The thermal desorption unit of claim 37, wherein said solid bodies are spherically shaped.

47. The thermal desorption unit of claim 37, wherein said solid bodies are metal balls.

48. The thermal desorption unit of claim 37, wherein said solid bodies are metal balls having a diameter between about one and six inches.

* * * * *